United States Patent
Scheib et al.

(10) Patent No.: US 7,128,360 B2
(45) Date of Patent: Oct. 31, 2006

(54) STRUCTURAL HYBRID ATTACHMENT SYSTEM AND METHOD

(75) Inventors: Charles Scheib, Grand Rapids, MI (US); Richard Allen Merrifield, Spring Valley, OH (US); Ronald F. Widin, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 78 days.

(21) Appl. No.: 10/846,003

(22) Filed: May 14, 2004

(65) Prior Publication Data

US 2004/0262954 A1    Dec. 30, 2004

Related U.S. Application Data

(63) Continuation-in-part of application No. 10/316,683, filed on Dec. 10, 2002, now abandoned.

(51) Int. Cl.
*B62D 25/14* (2006.01)
(52) U.S. Cl. .......................................... 296/70; 180/90
(58) Field of Classification Search ................. 296/70; 180/90
See application file for complete search history.

(56) References Cited

U.S. PATENT DOCUMENTS

| | | | | |
|---|---|---|---|---|
| 4,440,434 A | 4/1984 | Celli | ............................ | 296/185 |
| 6,129,406 A | 10/2000 | Dauvergne | ..................... | 296/70 |
| 6,250,678 B1 * | 6/2001 | Yoshinaka et al. | ............. | 180/90 |
| 6,315,347 B1 | 11/2001 | Gotz | ............................ | 296/72 |
| 6,450,533 B1 | 9/2002 | Kimura et al. | ............... | 280/779 |
| 6,497,775 B1 | 12/2002 | Visconti | ...................... | 156/73.1 |
| 6,502,897 B1 | 1/2003 | Neuss et al. | .................. | 296/208 |
| 6,508,967 B1 | 1/2003 | Visconti et al. | .............. | 264/138 |
| 6,558,146 B1 | 5/2003 | Shah et al. | ................... | 425/113 |
| 6,648,402 B1 | 11/2003 | Scheib et al. | ........... | 296/203.02 |
| 2001/0024035 A1 | 9/2001 | Scheib et al. | ................ | 280/779 |
| 2001/0043835 A1 | 11/2001 | Mainka et al. | ............... | 403/270 |
| 2002/0003354 A1 | 1/2002 | Inoue et al. | ................... | 296/70 |
| 2002/0024236 A1 | 2/2002 | Scheib et al. | ........... | 296/203.02 |
| 2002/0145309 A1 | 10/2002 | Shikata et al. | ............... | 296/208 |

OTHER PUBLICATIONS

Delphi Automotive Systems Saab Powerpoint Slide Presentation, Nov. 2000 (18 pages).
Delphi Automotive Systems Saab Powerpoint Slide Presentation, Aug. 17, 2000 (33 pages).

* cited by examiner

*Primary Examiner*—Lori L. Coletta
(74) *Attorney, Agent, or Firm*—Jimmy L. Funke

(57) ABSTRACT

An integrated structural system for a vehicle is provided. The integrated structural system includes a molded duct system configured to guide airflow having a first section and a second section and configured to operably attach a vehicle component thereto. The integrated structural system also includes a metal structure integrated with the molded duct system by means for integrating the metal structure with the molded duct system forming an integrated structural load path assembly. The integrated structural load path assembly is configured as a load bearing area to distribute a load of the vehicle component operably attached thereto. The means for integrating the metal structure with said molded duct system include, but not limited to, at least one of, sonic welding, heat staking, insert molding, and gluing.

17 Claims, 11 Drawing Sheets

STRUCTURAL HYBRID ATTACHMENT SYSTEM AND METHOD

CROSS REFERENCE TO RELATED APPLICATION

The present application is a continuation-in-part of assigned U.S. patent application Ser. No. 10/316,683 filed Dec. 10, 2002, now abandoned the contents of which are incorporated herein by reference thereto.

TECHNICAL FIELD

The present invention relates generally to vehicle structural systems, and more particularly to a structural attachment system having features for attaching components to one another within a vehicle, for providing reinforcement in load bearing areas of the components, and for allowing effective distribution of loads within the vehicle.

BACKGROUND OF THE INVENTION

Typically, a steering assembly of a vehicle includes a steering column extending between a steering mechanism, for example, a steering wheel, and a torque distribution mechanism. The steering column is designed to translate rotation of the steering wheel by a vehicle operator to the torque distribution mechanism which correspondingly positions the wheels of the vehicle in accordance with the position of the steering wheel, thus steering the vehicle.

It is desired that the steering column be of a sufficient compressive, shear, and torsional strength to endure the above described usage. The steering column designed as such can have a substantial mass and thus must be properly supported within the vehicle for effective functioning of the vehicle steering assembly.

Accordingly, the steering column is supported by attachment to a cross-car structural beam located within the vehicle. The load resulting from the weight of the steering column and other loads encountered during vehicle usage are distributed through the cross-car structural beam to side walls of the vehicle and/or to other parts of the vehicle where the cross-car structural beam is mounted thereto. The weight of the steering column is thereby conveyed, through the side walls and/or other vehicle parts, to a steel frame of the vehicle. Other parts of the vehicle which lend to the structural support system include, for example, a vehicle body, a front-of-dash, etc.

The cross-car structural beam is generally a load-bearing member that is also used to support an instrument panel assembly and a heating ventilation and air conditioning (HVAC) structural duct system, both located about the beam. The structural beam further serves as a reaction surface for occupant protection devices such as air bags or knee bolsters.

The steering column is typically attached to the cross-car structural beam directly or by a steering column support structure. The steering column support structure is composed of a metal or a composite and is attached at a first end to the cross-car structural beam and at a second end to the steering column.

The steering column support structure must support the load of the steering column and other loads associated with vehicle usage and effectively distribute the loads to the cross-car structural beam for distribution to the side walls of the vehicle.

Typically, the steering column structural support is mechanically attached at the first end to a load bearing area of the cross-car structural beam. The load bearing area is generally a portion of the cross-car structural beam and may be located, more specifically, at an underside of the beam. The steering column structural support is attached to the load bearing area by one or more threaded bolts and secured with fasteners such as nuts.

Lightweight air duct assemblies are composed of a molded plastic or a molded plastic composite and are mounted to the rigid cross-car structural beam. A metal-to-plastic interface between the nut/bolt arrangement and the air duct tends to degrade the plastic of the air duct. Hence, the overall attachment of the steering column and the cross-car structural beam is degraded. Thus, the use of extra parts, such as washers and the like, must be employed to preserve the plastic of the structural air duct.

The attachment of the steering column structural support and the cross-car structural beam using the nut/bolt arrangement must be performed manually and requires the handling of several parts and tools, thus valuable labor time is consumed and extra expense incurred.

Accordingly, it is desirable to have a structural attachment system for attaching, inter alia, a steering column to a cross-car structural beam that is light weight, simple to manufacture and assemble, provides an effective and efficient means to provide HVAC ducting and allow attachment of other components without the addition of separate brackets and additional hardware. Thus, a structural attachment system having less parts and assembly, more strength, and increased packaging space is desirable.

SUMMARY OF THE INVENTION

According to the present invention, an integrated structural system is provided for attaching components within a vehicle, for providing reinforcement in load bearing areas of the components, and for allowing effective distribution of loads within the vehicle.

The integrated structural system and method include a molded duct system configured to guide airflow having a first section and a second section and is configured to operably attach a vehicle component thereto. The integrated structural system also includes a metal structure integrated with the molded duct system by means for integrating the metal structure with the molded duct system forming an integrated structural load path assembly. The integrated structural load path assembly is configured as a load bearing area to distribute a load on said supporting surface over said integrated structural load path assembly. The means for integrating the metal structure with said molded duct system include, but not limited to, at least one of, sonic welding, heat staking, insert molding, and gluing.

In one embodiment, a method for an integrated structural system for a vehicle is disclosed. The method includes configuring a molded duct system to guide airflow having a first section and a second section; configuring the molded duct system to provide a supporting surface; and integrating a metal structure with the molded duct system by a means for integrating the metal structure with the molded duct system forming an integrated structural load path assembly. The integrated structural load path assembly is configured as a load bearing area to distribute a load on the supporting surface over the integrated structural load path assembly. The means for integrating the metal structure with the molded duct system includes one of; sonic welding, heat staking, insert molding, and gluing.

The structural attachment system of the present invention, provides for the attachment of various vehicle components and distributes loads and forces associated with the components throughout the vehicle structural support system.

The vehicle components include, but are not limited to, a steering column, an air bag, an instrument panel, an audio device, a video device, an HVAC assembly, and a storage compartment.

In one embodiment, the structural system utilizes a steering column support unit with to attach the steering column and a structural air duct assembly.

The various embodiments of the present invention described attach and support the steering column, reinforce a load bearing area of the structural air duct assembly, regulate vertical oscillatory motion of, inter alia, the steering column, and distribute the loads of the steering column across the structural air duct assembly and elsewhere throughout the vehicle.

The integrated structural system of the present invention provides for a vehicle hybrid structural system of reduced mass and high strength using plastic and metal, respectively. The assembly described herein reduces extra parts needed for assembly and provides a simplistic design allowing for ease of installation.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
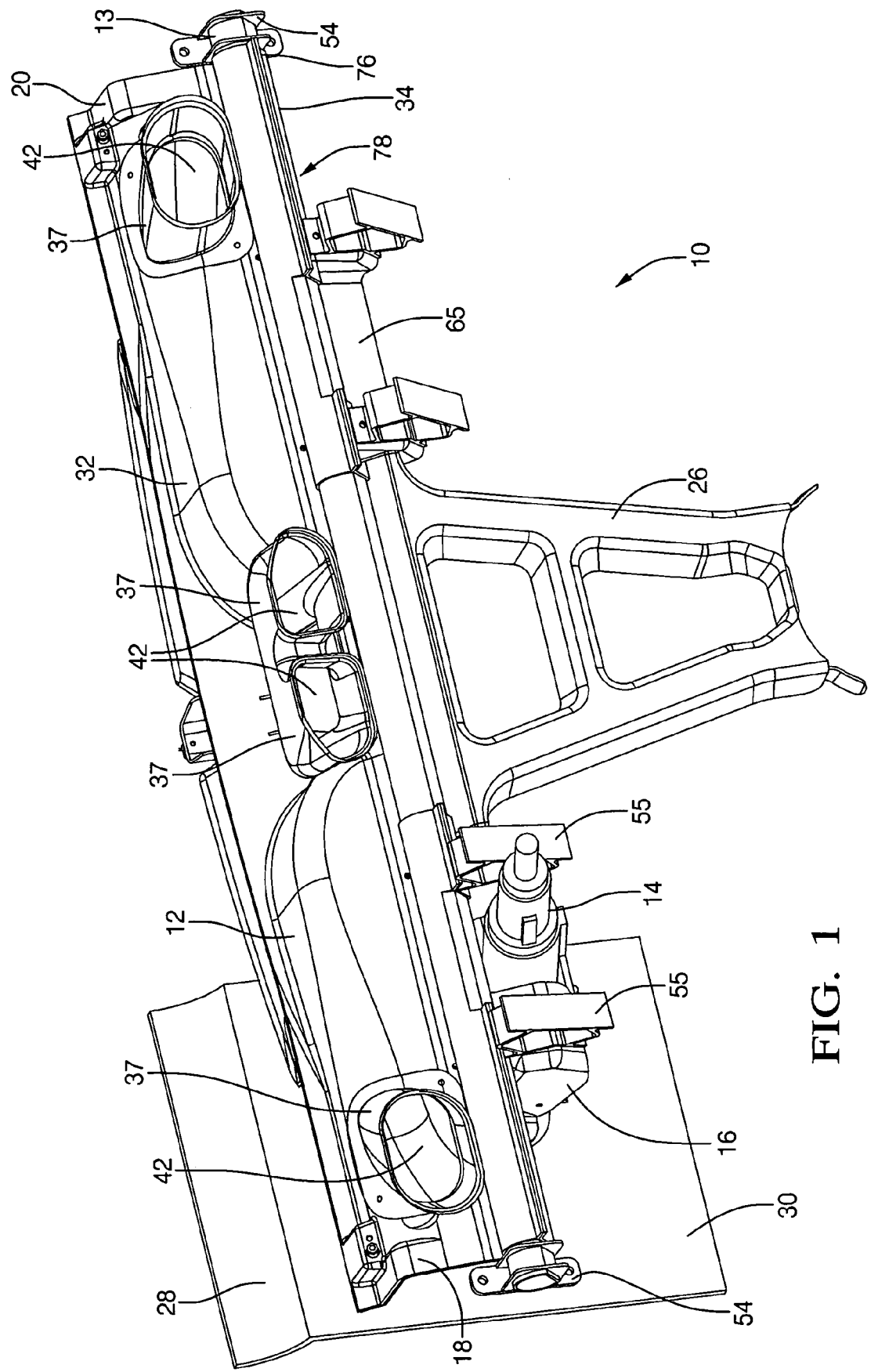
FIG. 1 is a perspective view of a structural attachment system of the present invention.

FIG. 1 illustrates a front perspective view of a structural hybrid support system 10 in one embodiment of the present invention.

Structural support system 10 is located within a vehicle. Structural hybrid support system 10 includes a first structural member 12, a metal structure 13 configured as a metal tube 13, and a vehicle component 14. First structural member 12, tube 13 and vehicle component 14 are disposed adjacent to one another.

Structural support system 10 also includes an attachment assembly 16 positioned relative to first structural member 12, tube 13 and vehicle component 14. Attachment assembly 16 attaches vehicle component 14 to first structural member 12 and tube 13 and facilitates the distribution of loads of vehicle component 14 across first structural member 12 and tube 13.

Figure 2:
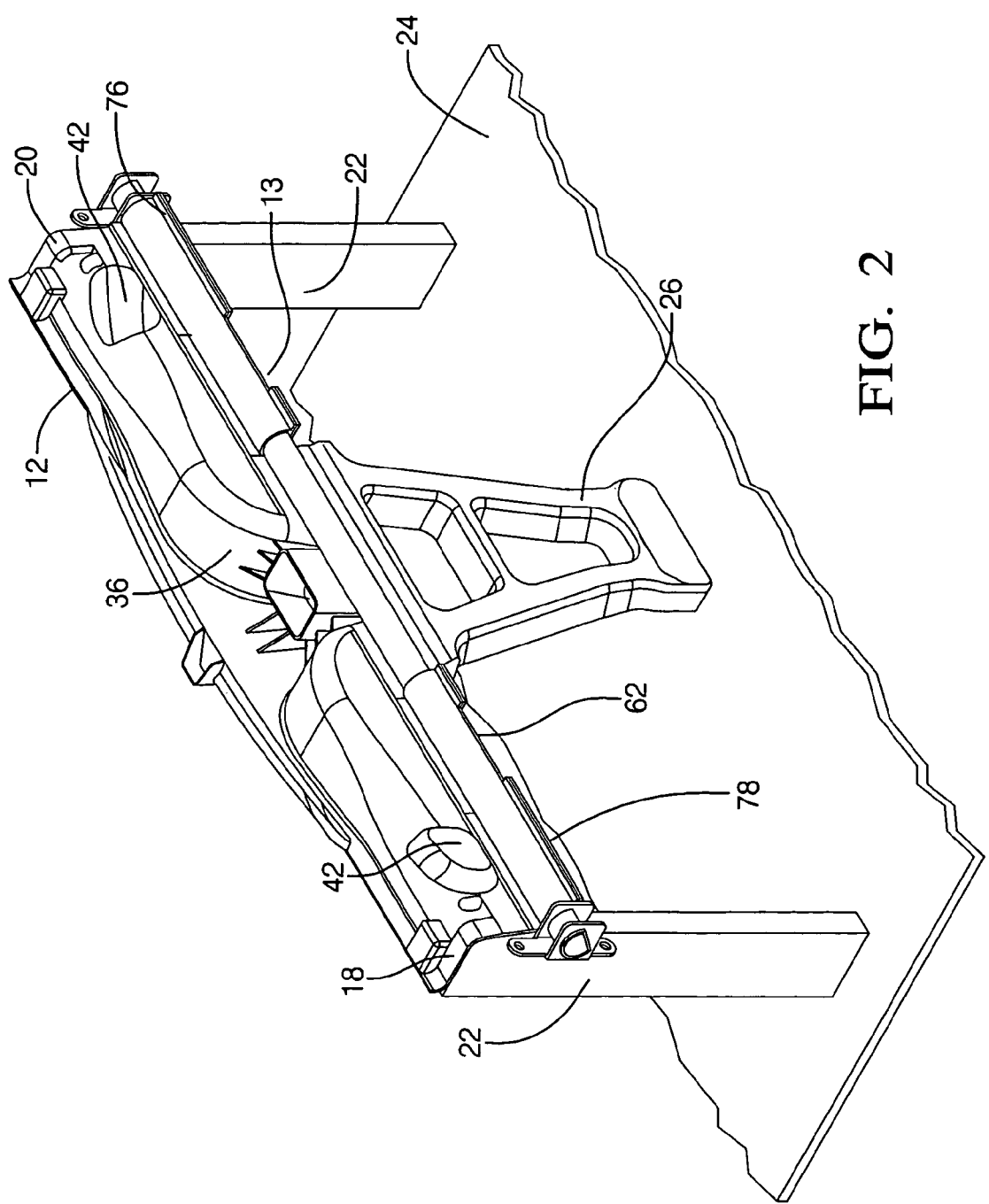
FIG. 2 is another perspective view of the structural attachment system of FIG. 1.
Figure 3:
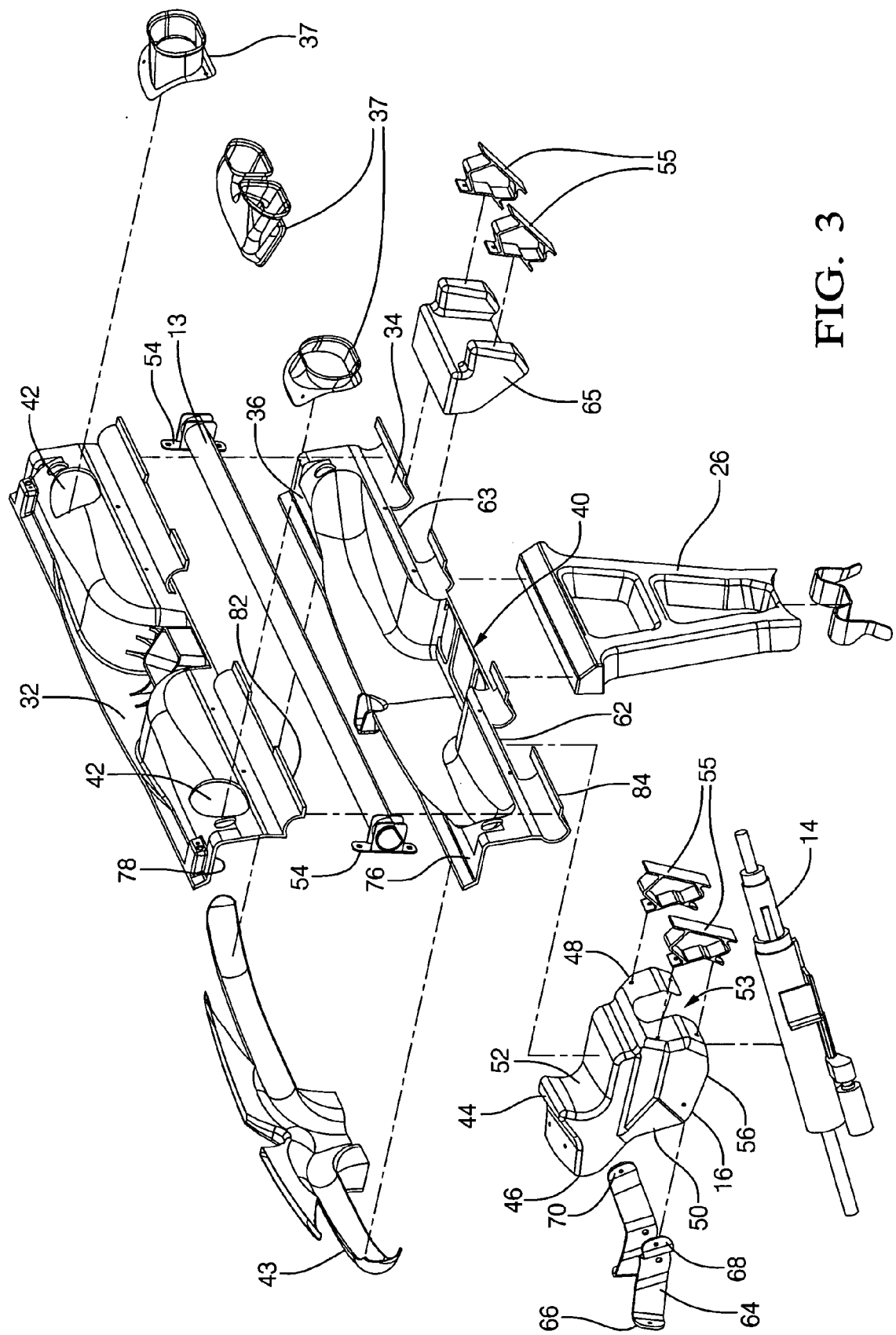
FIG. 3 is an exploded perspective view of the structural attachment system of FIG. 1.
Figure 6:
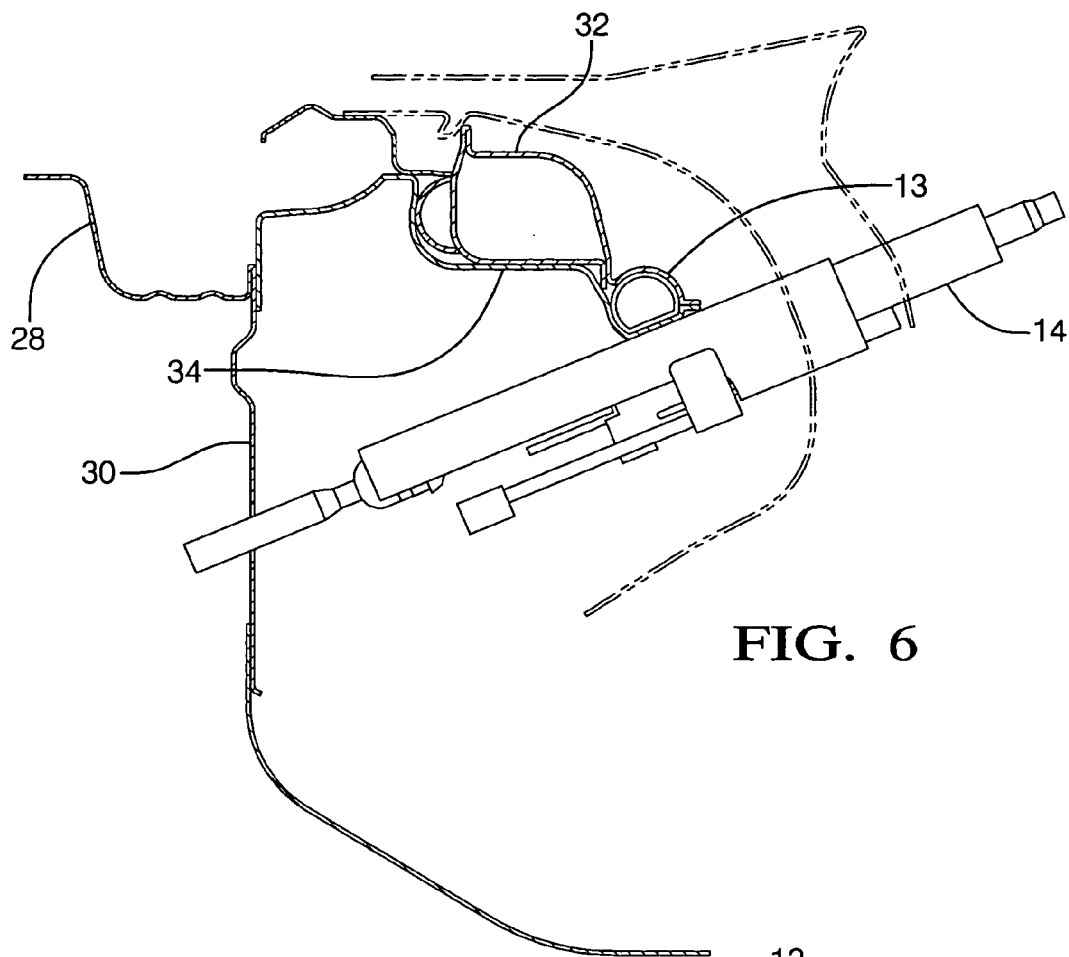
FIG. 6 is a graphical side view of the structural attachment system of FIGS. 1 and 5.

Referring now to FIGS. 1–3, first structural member 12 is a structural air duct assembly. Structural air duct assembly 12 includes opposing ends 18 and 20. Opposing ends 18 and 20 also define ends of tube 13 extending a length of structural air duct assembly 12. Structural air duct assembly 12 is attached to side walls 22 of the vehicle. Side walls 22 are mounted atop a vehicle floor 24 of the vehicle. Structural air duct assembly 12 is supported by tube 13 and a center brace 26 which extends from structural air duct assembly 12 to vehicle floor 24. Structural air duct assembly 12 is also supported by a plenum 28 and a vehicle body 30 (see also FIG. 6). In one embodiment, vehicle body 30 includes an engine wall as depicted in FIG. 1.

Structural air duct assembly 12 is formed of at least two sections including a first section 32 and a second section 34. First and second sections 32 and 34 are complementary in nature so as to permit the two to mate with each other to form structural air duct assembly 12. Second section 34 comprises a lower base section. First section 32 comprises an upper section. First and second sections 32 and 34 are mated to one another to form structural air duct assembly 12 having tube 13 therebetween to integrate the energy management properties of tubular metal and the integration potential of molded plastic components. First and second sections 32 and 34 can be connected at at least one end by a living hinge about which first and second sections 32 and 34 are rotated into a mated position surrounding tube 13 therein in a manner to form a metal/plastic system and at another end by a means for integrating sections 32 and 34 into a metal/plastic hybrid system, thus forming structural air duct assembly 12. The means for integration at the other end include, but not limited to, mechanical attachment, chemical attachment, or thermal attachment (e.g., vibration or sonic welding), etc. The metal/plastic system is structurally integral in the manner in which it carries the loads of the components attached thereto, as well as the way that the system supports the vibration of the overall systems resonance frequency.

Second section 34 includes a first surface 76 while first section 32 includes an opposing second surface 78. First surface 76 contacts first section 32 when first and second sections 32 and 34 are mated to form structural air duct assembly 12.

First and second sections 32 and 34 may be secured to one another by any number of techniques including using a sonic welding process in which first and second sections 32 and 34 are attached to one another at selected points. First and second sections 32 and 34 also secure tube 13 therebetween using any number of techniques including using weldment and bonding processes including, but not limited to, sonic welding, heat staking, gluing, and insert molding (e.g., via compression molding or injection molding), and the like. It will be further recognized by one skilled in the pertinent art that identical and different techniques may be employed for attaching first and second sections 32 and 34 to each other, as well as to tube 13, both of which is discussed more fully with respect to FIGS. 8–16. It will also be noted that it is envisioned that first and second sections 32 and 34 may be a one-piece formed structure, wherein the first and second sections 32 and 34 define portions of the one-piece structure integrated with tube 13.

In an exemplary embodiment, structural air duct assembly 12 is formed by insert molding first and second sections 32 and 34 with tube 13. In particular, tube 13 is insert molded with sections 32 and 34 using a compression molding process known as extrusion deposition compression molding (EDCM) as described in U.S. Pat. Nos. 6,648,402, 6,558,146, 6,508,967, and 6,497,775, assigned to the assignee of the present application and the contents of which are incorporated herein by reference in their entirety.

EDCM is an open mold process, and this feature allows for the use of specific processing techniques to combine different polymer materials and/or inserts within the same tool or mold cavity.

Figure 19:
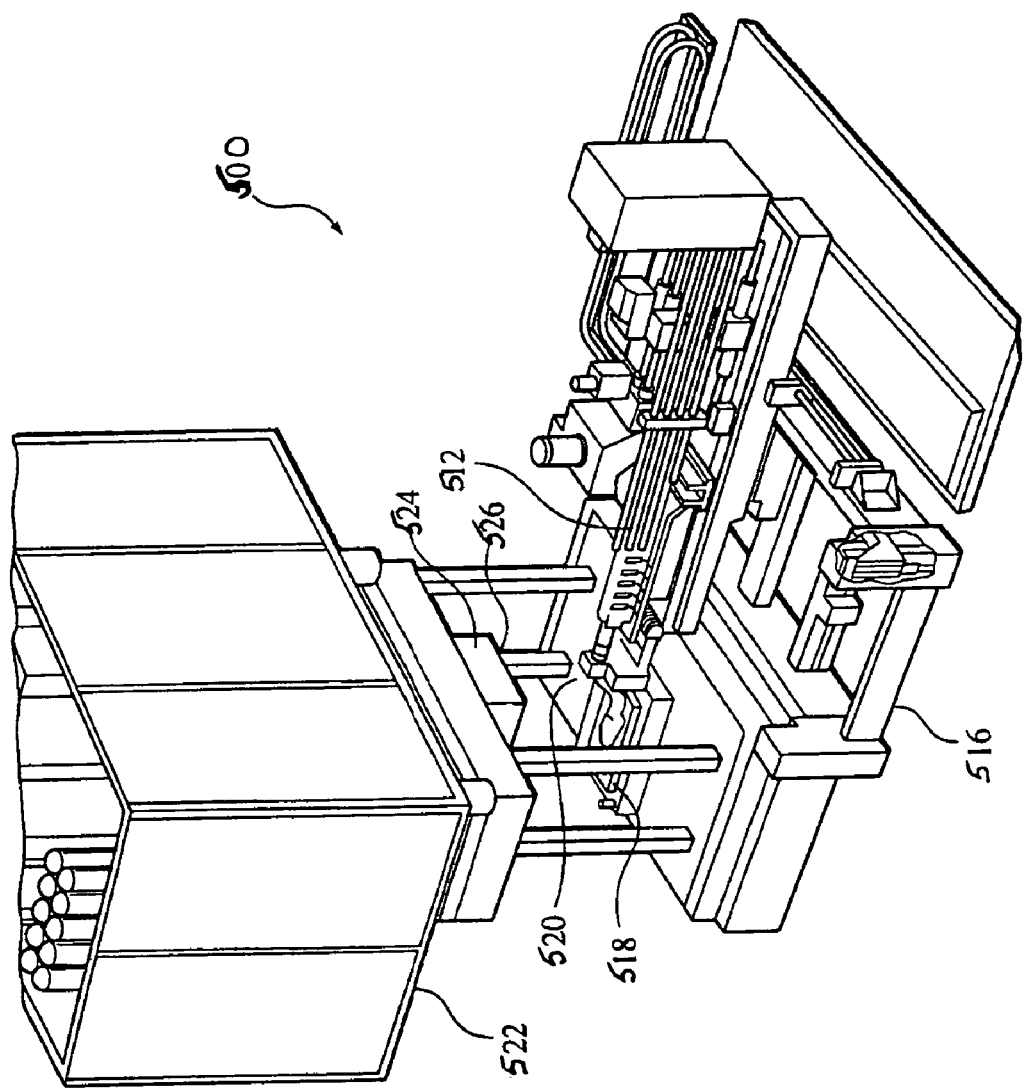
FIG. 19 is a perspective view of an extrusion deposition compression molding (EDCM) assembly 500 in accordance with an exemplary embodiment.

Referring now to FIG. 19, an extrusion deposition compression molding (EDCM) apparatus 500 is shown. The apparatus broadly performs an EDCM process or otherwise known as extrusion compression molding, or melt compression molding, or back compression molding, or compression molding of molten thermoplastic materials. The apparatus in one embodiment has a pair of extrusion/deposition units 512 (only one shown) mounted on a positioner 516. The positioner is preferably a programmable X-Y-Z positioner.

Positioner 516 relocates or moves the extrusion/deposition units so that a melted polymer may be disposed across a first mold cavity 518 of a mold 520. The first mold cavity embodies a portion of the shape of the item to be molded.

Molten thermoplastic is disposed into the first mold cavity from the extrusion/deposition units until the required amount of material is (or materials are) deposited within the first mold cavity. The first mold cavity is positioned and secured onto the lower platen of a press 522. Press 522 has a deployable member 524, also known as the upper platen, on which is positioned and secured a second mold cavity 526. Second mold cavity 526 is a complementary to first mold cavity 518. Accordingly, and after the molten thermoplastic is deposited within the first mold cavity, the press lowers the second mold cavity over the first mold cavity causing the deposited thermoplastic material to flow and be molded by the first and second mold cavities. It is also noted that first mold cavity 518 and second mold cavity 526 are removable so that other mold cavities can be appropriately placed to mold other objects.

In an exemplary embodiment, press 522 is a hydraulic press, however, other presses capable of lowering the second mold cavity over the first with the required amount of force are also contemplated to be within the scope of the present invention.

Press 522 exerts a force on the second mold cavity which makes contact with the exposed surface of the molten thermoplastic as well as provides a boundary for the molten thermoplastic to take form and cool or set after being deposited or disposed in the first mold cavity.

In addition, press 522 will maintain the pressure force on the materials that are being molded (typically molten thermoplastic) as the materials cool and shrink or set. Thus, there will be no deformations in the item being molded due to shrinkage or settling within the mold. This can be accomplished through the use of a thermister or other temperature measuring device to determine when the molded part has reached the proper temperature for demolding, or it can be accomplished by waiting the proper amount of time prior to demolding. In addition, or as an alternative, a pressure gauge can be positioned to measure the pressure between first mold cavity 518 and second mold cavity 526. Thus, the information from the thermister or pressure gauge or both can be supplied to a controller which will maintain or possibly increase the pressure being applied by press 522.

For example, the molten thermoplastic is generally in an expanded state when compared to its cooled or cured temperature. Thus, press 522 must apply a greater force when the molten thermoplastic is in the mold. In addition, and when the material cools, the press will have to lower the second mold cavity in order to maintain contact with the curing material.

Accordingly, a more uniform shape in the item being molded is maintained by having a continuous pressure force applied by the press. By pressing and following the materials in the mold cavity as they contract, the press also eliminates stresses and defects that may result from the shrinkage of the molten thermoplastic.

As an alternative to lowering the second mold cavity and maintaining the pressure on the cooling thermoplastic materials, the second cavity may be stopped using stop blocks at a specified component thickness. This is done when the thermoplastic material includes a blowing or foaming agent or when one of the inserted non-molten materials is compressed during the lowering of the second mold cavity, but it also can be done using only thermoplastic materials that have minimal shrink or that otherwise do not result in problems due to shrinkage.

As a further alternative, the second mold cavity 526, after being lowered onto the first mold cavity 518, can be lifted away from the melted thermoplastic a minimal amount and lowered again, and this can be done several times during the cycle of molding a part.

In an exemplary embodiment, extrudate is dispensed from assembly 500 as a resin and includes fibers (e.g., fiberglass) of about 4 to about 6 inches in length. In particular, extrudate preferably includes chopped carbon fibers. EDCM allows reduced molding pressures and control of orientation of the reinforcing fiber within the structural air duct assembly 12.

The EDCM process provides a manufacturing cost reduction which is realized due to optimal material usage. Optimal material usage is accomplished by one or more of the following alternatives: (1) a lower cost material may be used for any specific area of the part due to the application of optimum reinforcement material and placement and use of the optimum material for each function and (2) the present invention provides the ability to mold thinner sections across the structural beam as may be justified by structural analysis. Additional cost savings are achieved through lower cost tooling and reduced tonnage equipment.

The EDCM process requires lower pressures as compared to other molding processes and accordingly results in a reduction in the tonnage of force and machinery required by the process. In addition, the EDCM process allows the use of more complex molds therefore the molded item will have fewer attached parts as they can be mold directly. By eliminating or using fewer attached parts, there is reduced opportunity for squeaks and rattles and other quality deficiencies to occur. Furthermore, EDCM offers improved recyclability, a reduction in production costs, and ease of manufacture. When first and second sections 32 and 34 mate with each other having tube 13 therebetween, one or more duct passageways 36 are formed. Duct passageways 36 carry and direct air to predetermined locations within a vehicle passenger compartment via duct terminals 37 extending from openings 42 in first section 32.

Figure 4:
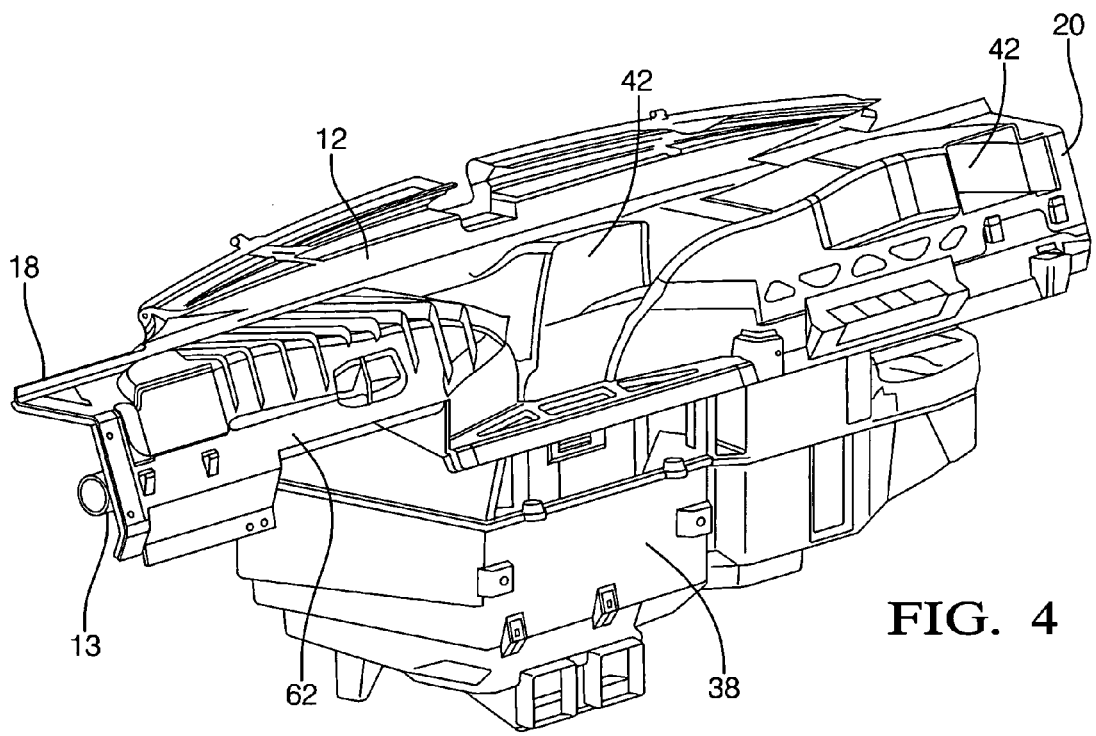
FIG. 4 is a perspective view of a structural air duct assembly of FIG. 2 with an HVAC module attached thereto.

Structural air duct assembly 12 is coupled to a heating, ventilating, and air conditioning (HVAC) module 38 (FIG. 4). HVAC module 38 is disposed within the vehicle in fluid communication with structural air duct assembly 12. HVAC module 38 includes a hollow housing within which are contained heat exchangers and various airflow directing devices. HVAC module 38 receives air from an upstream blower unit and adjusts the temperature of this air before redirecting and delivering the tempered air to structural air duct assembly 12 through which the air passes to the passenger compartment. HVAC module 38 accordingly tempers the air by use of a reheat and air mix assembly composed of various heat exchangers disposed within the housing.

Second section 34 contains an HVAC opening 40. HVAC opening 40 is designed to communicate with HVAC module 38 so as to receive the tempered air therefrom. First and second sections 32 and 34 further include a plurality of vent openings 42 formed therein at a variety of locations to facilitate distribution of the tempered air. For example, some of openings 42 may be located proximate to a vehicle windshield to promote defogging and defrosting of the windshield. A secondary air passageway 43 may also be in communication with opening 40 and disposed between sections 32 and 34 for defogging and defrosting of the windshield. Further, some of the openings 42 may be located proximate to a vehicle floor of the passenger compartment and are typically used as heater outlets. Additionally, openings 42 are formed at mid-height relative to the windshield and floor openings and are generally designed as air-conditioning or cooling outlets.

Structural air duct assembly 12 may be composed of any material sufficient for purposes within the scope of the present invention preferably including, but not limited to, molded plastic including combinations thereof.

Structural air duct assembly 12 is generally a load bearing and load distributing assembly. Structural air duct assembly 12 includes a load bearing surface 62 where loads of various vehicle components are variously applied. Load bearing surface 62 corresponds to location of metal tube 13 extending a length of structural air duct assembly 12.

Referring now to FIGS. 1–7, vehicle component 14, in the present exemplary embodiment, is a steering column. Steering column 14 is attached to structural air duct 12 by attachment assembly 16.

Attachment assembly 16 includes a steering column support unit 44. Steering column support unit 44 includes a front portion 46 and an opposing rear portion 48. Steering column support unit also includes sides 50. An attachment element 52 extends from front portion 46 to rear portion 48. Front and rear portions 46 and 48, sides 50, and attachment element 52 form a support unit cavity 53 at an interior of steering column support unit 44.

Steering column support unit 44 also includes a bottom portion 56 formed opposite attachment element 52. Bottom portion 56 is open, thus support unit cavity 53 is exposed.

Rear portion 48 includes a steering column opening 58 formed therein to receive steering column 14 into support unit cavity 53. Rear portion also includes knee bolsters 55 coupled thereto.

Front and rear portions 46 and 48 are positioned to allow extension of steering column 14 through steering column support unit 44. For example, front portion 46 may be positioned at a point above second portion 48 within the vehicle such that steering column 14 may by received at opening 58 and extend through support unit cavity 53, out bottom portion 56, and beyond steering column support unit 44. Alternatively, front portion 46 may be angled relative to rear portion 48 thus allowing extension of steering column 14 through steering column support unit 44 as described.

Attachment element 52 is a contoured surface which generally has a shape formed to facilitate attachment with structural air duct 12. Attachment element may be shaped to mate flush against a portion of structural air duct 12.

Steering column support unit 44 may be formed of any substance sufficient for purposes within the scope of the present invention. For example, steering column support unit 44 may be formed of a metal such as steel or magnesium, or unit 44 may be formed of a plastic or a plastic/metal composition. Alternatively, steering column support unit 44 may be formed of a composite fiber.

Steering column support unit 44 is attached at attachment element 52 to load bearing area 62 of structural air duct assembly 12 by, for example, mechanical, thermal, or chemical attachment methods. Further, steering column support unit 44 may be integrally formed with structural air duct assembly 12.

Steering column support unit 44 composed of metal is mechanically fastened to structural air duct 12. Steering column support unit 44 composed of metal may be formed by stamping, bending, hydroforming, extruding, casting, etc.

Steering column support unit 44 composed of plastic may be formed individually in a molding process and then attached to structural air duct 12. Such attachment may be accomplished by a chemical means, for example glue, or by thermal means, for example welding. Welding techniques used to attach steering column support unit 44 and structural air duct 12 include vibration and sonic welding.

Alternatively, steering column support unit 44 composed of plastic may be formed integrally with structural air duct assembly 12. That is, steering column support unit 44 and structural air duct assembly 12 may be molded integral to one another during the molding process.

Attachment element 52 provides a surface by which structural air duct 12 and steering column support unit 44 are attached. Where steering column support unit 44 is composed of metal, the unit is coupled by mechanical means to structural air duct assembly 12 at attachment element 52.

Where steering column support unit 44 is composed of plastic, the unit is coupled to structural air duct assembly 12 by welding or integral molding at attachment element 52.

As mentioned, attachment element 52 is shaped to correspondingly mate with structural air duct assembly 12. Attachment element 52 transfers loads associated with steering column 14 to structural air duct assembly 12 and regulates and controls vertical oscillatory motion thereof.

Steering column support unit 44 may be selectively reinforced to effectively and efficiently attach to, and bear loads associated with attachment to, structural air duct assembly 12 and steering column 14. Particularly, attachment element 52 and/or the load bearing area 62 may be reinforced. Reinforcement may be provided homogenously or in selected regions.

As mentioned, load bearing area 62 is located at a point where steering column support unit 44 is attached to structural air duct assembly 12 and metal tube 13. Specifically, load bearing area 62 is located on an underside of second section 34 of structural air duct 12 proximate a flat portion 57 of metal tube 13. Tube 13 at load bearing area 62 receives loads of steering column 14 and transfers the loads across and throughout structural air duct assembly 12.

Adjacent to load bearing area 62 is another load bearing area 63 corresponding to a front passenger area of the vehicle cockpit. A passenger knee bolster support 65 is located at load bearing area 63 for support of a set of passenger area knee bolsters 55 mounted thereto.

Reinforcement with metal tube 13 ensures an efficient and effective attachment of steering column support unit 44 to structural air duct assembly 12. Also, reinforcement of attachment proximate flat portion 57 of tube 13 provides discrete localized structural reinforcement within structural support system 10 which facilitates the support and distribution of steering column loads throughout support system 10.

Ends 18 and 20 of tube 13 depend from mounting brackets 54 configured to couple with vehicle body 30 when mounting brackets 54 are installed in the vehicle. Mounting brackets 54 are configured to limit rotation of tube 13 by employing flat portion 57 against a complementary configured opening in each bracket 54 to prevent rotation of tube 13.

Figure 5:
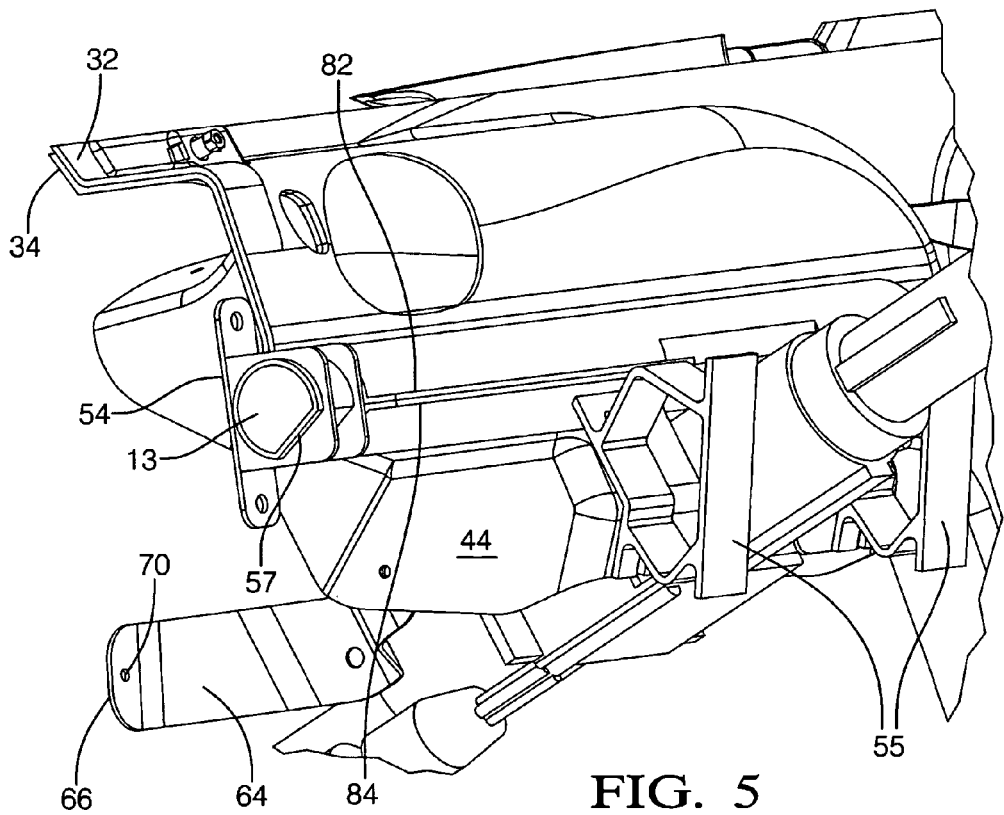
FIG. 5 is an enlarged partial perspective view of the structural attachment system of FIG. 1.
Figure 8:
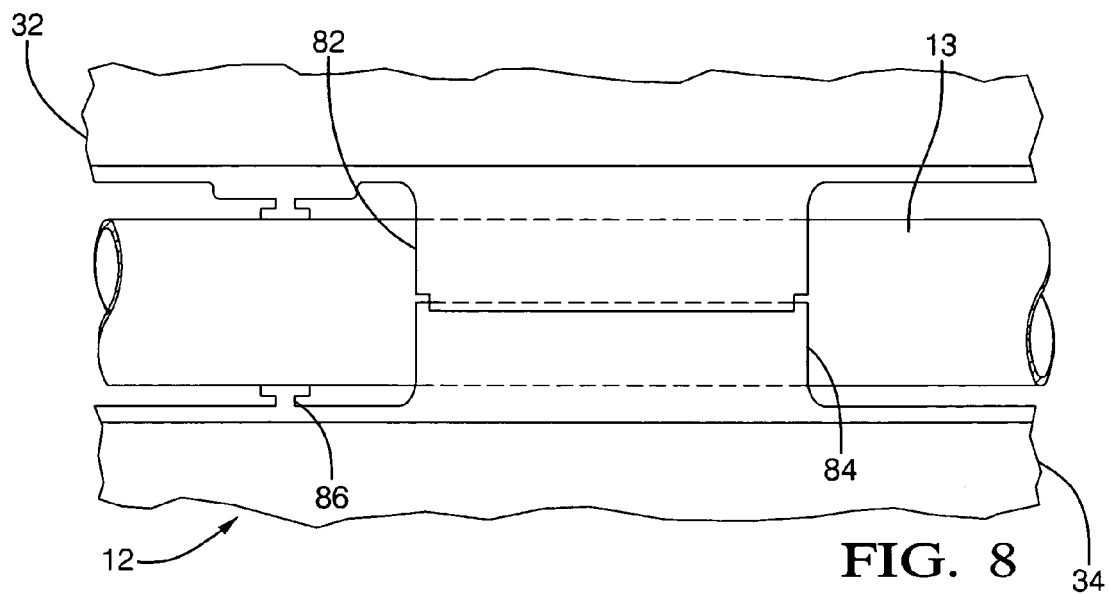
FIG. 8 is a front view of an exemplary attachment means between a metal tube and upper and lower sections of the structural attachment system of FIGS. 1–6.

Attachment assembly 16 further includes mounting members 64 (FIGS. 1, 5 and 8). Mounting members 64 provide for the securement of steering column 14 to steering column support unit 44.

Mounting members 64 are generally plate-like members and each includes a front portion 66 and a rear portion 68. Front portion 66 and rear portion 68 are designed to couple with vehicle body 30 and steering column support unit 44, respectively, when mounting members 64 are installed in the vehicle. Particularly, front and rear portions 66 and 68 include mounting holes 70 through which a bolt/nut assembly may be passed to secure mounting members 64 within structural support system 10. Alternatively, front and rear portions 66 and 68 may be welded to or integrally formed within structural support system 10.

Mounting members 64 each also include a steering column portion 72. Steering column portion 72 extends between front and rear portions 66 and 68. Mounting members 64 are attached to steering column 14 at steering column portion 72. Specifically, steering column portion 72 may include mounting holes 70 to facilitate mechanical attachment of mounting members 64 to steering column 14. Alternatively, steering column portion 72 may coupled with steering column 14 by chemical attachment, for example glue, or by welding, or by any form of integral attachment or otherwise such that steering column 14 is securely attached to mounting members 64.

Steering column portion 72 may be shaped and contoured to best transfer and distribute various loads of steering column 14 within structural support system 10. Specifically, steering column portion 72 may be shaped to effectively distribute steering column loads to vehicle body 30 and to steering column support unit 44. Steering column portion 72 may include apertures 74 variously formed therein to reduce mass of mounting members 64 while preserving structural integrity thereof.

Figure 7:
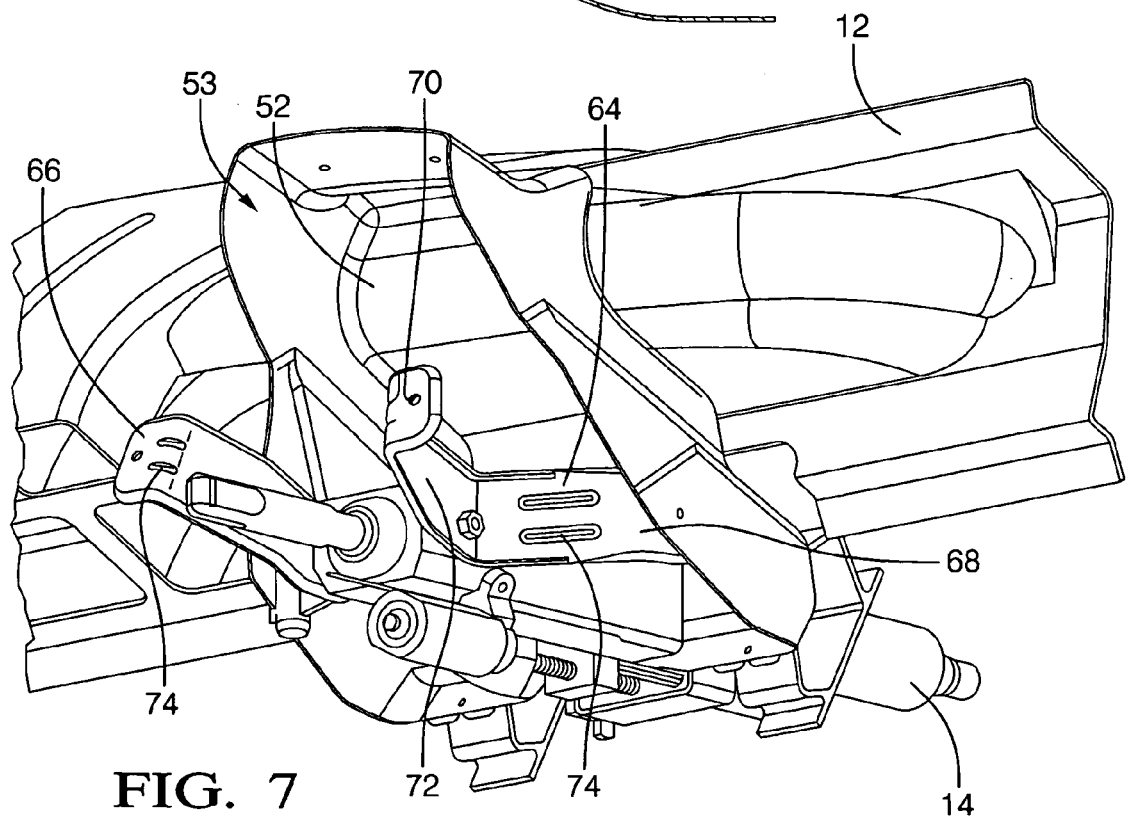
FIG. 7 is another view of the structural attachment system of FIG. 1.

In FIG. 7, two mounting members 64 are secured at steering column portions 72 with nut/bolt assemblies to opposing sides of steering column 14. Rear portions 68 extend through bottom portion 56 into support unit cavity 53 of steering column support unit 44. Therein, rear portions 68 are coupled to sides 50. Steering column support unit 44 is attached to load bearing area 62 of structural air duct assembly 12.

Steering column 14 imparts a load upon mounting members 64. The load may act in any direction or in various directions, particularly during vehicle operation. The load is transferred through mounting members 64 to front and rear portions 66 and 68. The load is distributed to vehicle body 30 at front portions 66 and to steering column support unit 44 at rear portions 68. The load directed to vehicle body 30 is variously distributed to the structural system of the vehicle including vehicle floor 24.

The load is directed toward steering column support unit 44 is transferred through attachment element 52 to load bearing area 62 and across structural air duct assembly 12 of FIGS. 1–3. Structural air duct 12 distributes the load in part to side walls 22 and in part to plenum 28. Ultimately, the load directed to structural air duct assembly 12 is distributed to the structural system of the vehicle including vehicle floor 24.

Steering column 14 can also attain a first natural frequency which can result in vertical oscillatory motion of steering column 14. Structural support system 10 regulates the occurrence of the first natural frequency and controls resulting vertical oscillatory motion. Regulation of such occurrences is tempered by integration of metal structure 13 with first and second sections 32 and 34 by means for integrating the same, including, but not limited to, mechanical attachment, chemical attachment, or thermal attachment (e.g., vibration or sonic welding), etc., as disclosed more fully hereinafter with reference to FIGS. 8–18.

Referring now to FIG. 8, one embodiment of structural air duct assembly 12 is illustrated. Duct assembly 12 includes first section 32 having a first flange portion 82 extending from a portion of first section 32 configured to encase an upper portion and facing side of metal tube 13. A second flange portion 84 extends from a portion of second section 34 configured to encase a lower portion and facing side of metal tube 13. First and second sections 32 and 34 further include moldable protrusions 86 extending toward and in contact with metal tube 13. Metal tube 13 is fabricated as a hollow or solid tube by stamping, casting, and the like. Metal tube 13 is composed of a metal including, but not limited to steel, aluminum, and magnesium, including combinations of at least one of the foregoing.

First and second sections 32 and 34 are fabricated using injection molding, compression molding, blow molding, and the like, preferably using a suitable plastic material.

First and second sections 32 and 34 are joined encasing tube 13 therebetween via connection of first and second flange portions 82 and 84 and protrusions 86 with tube 13. More specifically, the resulting metal/plastic structural duct system can be considered structurally integral by means of, but not limited to, vibration welding, sonic welding, heat staking, gluing, and insert molding.

Figure 11:
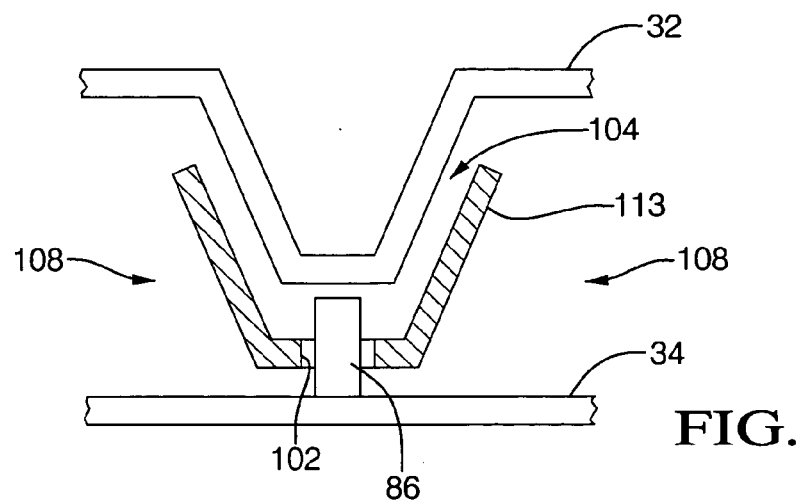
FIG. 11 is a side view of another structural attachment system employing another exemplary attachment means between a metal support and upper and lower sections before heat staking.

Still referring to FIG. 8, protrusions 86 are configured similarly to the protrusion 86 depicted in FIG. 11 before processing to form the integral structural duct system. After processing protrusion 86 to form the resulting metal/plastic system, protrusion 86 "mushrooms" to form a firm bond with metal tube 13 in FIG. 8. Processing for both firmly connecting protrusion 86 to tube 13 and first and second flange portions 82 and 84 together include vibration welding, sonic welding, heat staking, gluing, and insert molding, including using combinations of at least one of the foregoing.

Figure 9:
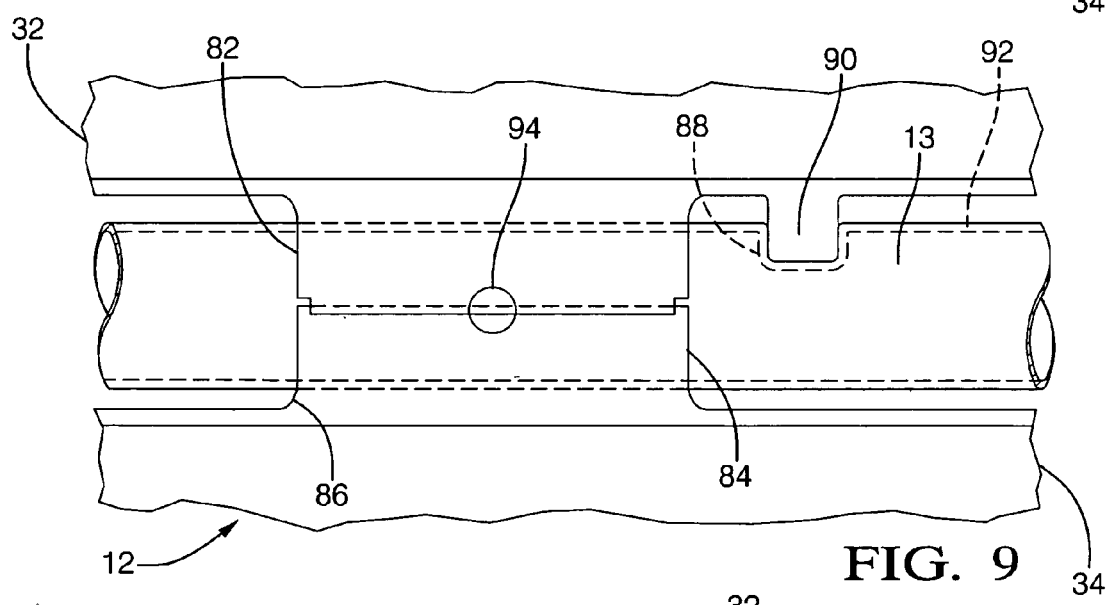
FIG. 9 is a front view of another attachment means between the metal tube and upper and lower sections of the structural attachment system of FIGS. 1–6.

Referring to FIG. 9, tube 13 is shown with a cavity 88 depicted with phantom lines. In this embodiment, cavity 88 provides an area for a plastic tab 90 extending from first section 32 to be integrated with metal tube 13. It will be recognized that cavity 88 may extend through a portion or entirely through a wall 92 defining tube 13. Furthermore, it will be recognized that cavity 88 may take the form of any suitable shape to receive tab 90 therein to integrate first section 32 with tube 13. Plastic tab 90 is received and retained in cavity by employing, but not limited to, heat staking, injection molding, insert molding, compression molding, sonic welding, vibration welding, and the like.

As in FIG. 8, FIG. 9 illustrates first flange portion 82 extending from first section 32 and second flange portion 84 extending from second section 34. First and second flange portions are proximately positioned relative to each other for vibration welding to each other shown generally at 94, for example. This relationship is more clearly depicted with reference to FIG. 5 showing first and second flange portions in perspective view.

Figure 10:
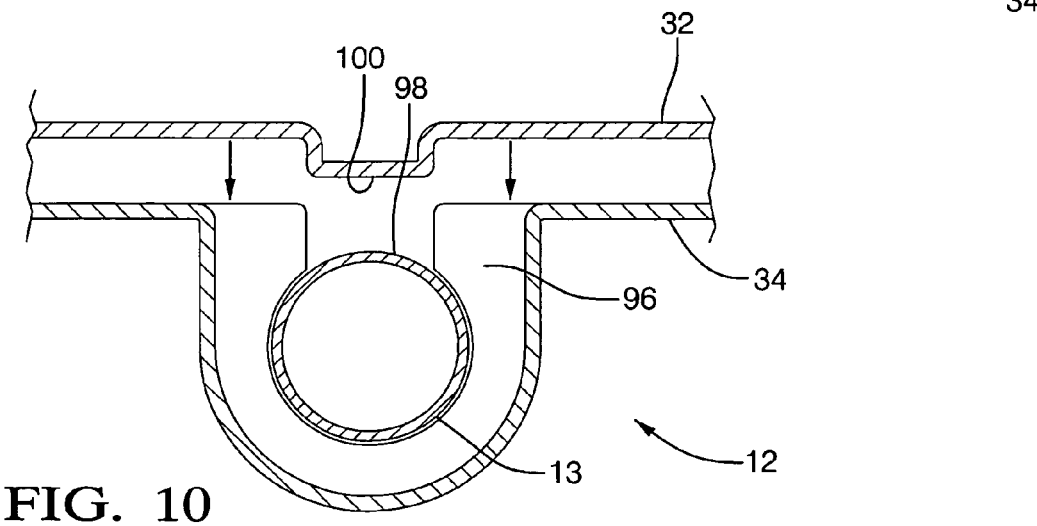
FIG. 10 is side view of another attachment means between the metal tube and upper and lower sections of the structural attachment system of FIGS. 1–6.

Referring now to FIG. 10, another embodiment illustrates integration of first section 32, second section 34 and tube 13 to form an integrated structural load path assembly for distributing a load of a vehicle component mounted thereto. Vehicle components including, but not limited to, a steering column, instrument panel, storage compartments (i.e., glove box), radio/navigation assembly and other audio/visual devices are contemplated. FIG. 10 depicts tube 13 being insert molded within second section 34 during molding thereof. More specifically, tube 13 is trapped with molten plastic 96 while molding second section 34 leaving a portion 98 of metal tube 13 exposed for insert molding first section 32 thereto. After first section 32 is insert molded having tube 13 disposed therein, second section 34 is insert molded to attach a portion 100 of second section 34 to exposed portion 98 of tube 13. Furthermore, portions of first section 32 in contact with portions of second section 34 adhere to integrate first and second sections to form an integrated structural duct assembly 12 having air ducts configured therein to guide air flow within the vehicle compartment.

Referring now to FIG. 11, metal structure 13 is configured as a three-sided metal frame member 113 having an aperture 102 configured therein to receive protrusion 86 extending from second section 34. First section 32 is configured to be received in an internal portion 104 defined by the three-sided frame member 113 and make contact with protrusion 86 extending through aperture 102.

Figure 12:
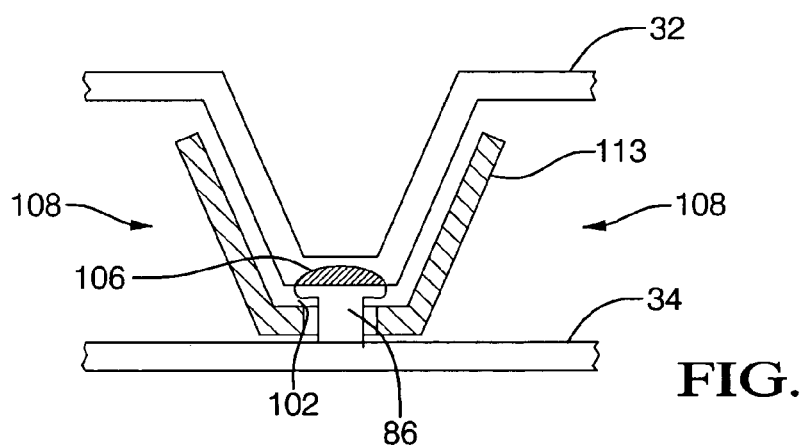
FIG. 12 is a side view of the structural attachment system of FIG. 11 after heat staking.

Referring now to FIG. 12, protrusion 86 is shown after means for integrating first and second sections 32 and 34, along with metal frame member 113 is completed. More specifically, after integrating first and second sections 32, 34 and member 113 by, but not limited to, heatstaking, vibration welding, sonic welding, and the like, protrusion 86 widens and fills aperture 102 and mushrooms at a top portion while welding with first section 32 shown generally at 106. In this manner, first and second sections 32 and 34 along with metal frame member become integrated to form an integrated structural load path assembly mounted as a cross car structural beam in the vehicle. It will also be recognized that in the embodiments depicted in FIGS. 11 and 12 cross sections of air ducts 108 are formed by joining first and second sections 32 and 34 around metal frame member 113.

Figure 13:
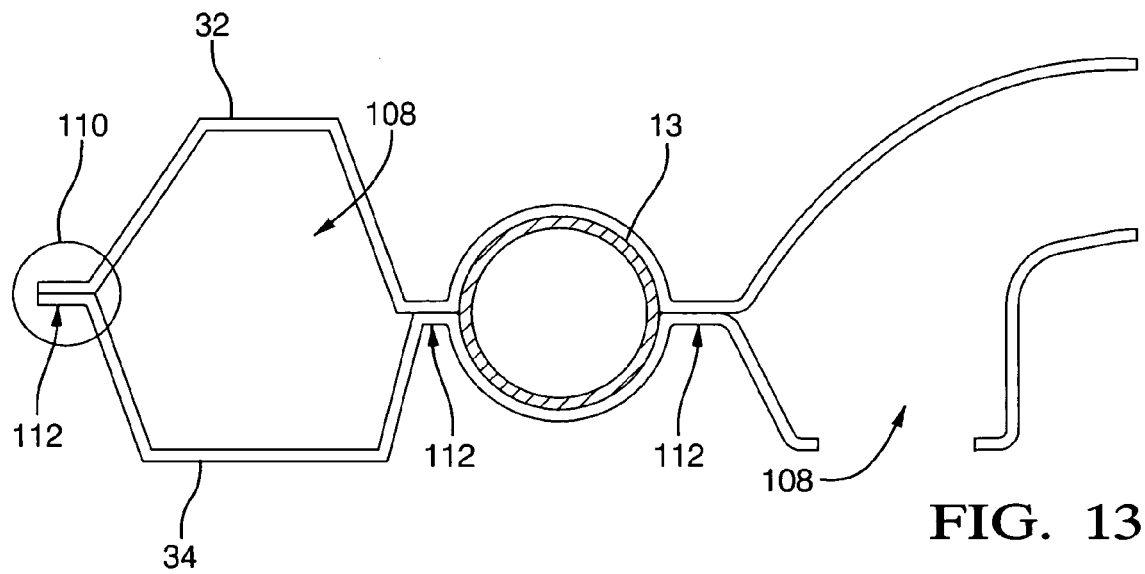
FIG. 13 is a side view of another structural attachment system employing another exemplary attachment means between a metal tube and upper and lower sections.
Figure 14:
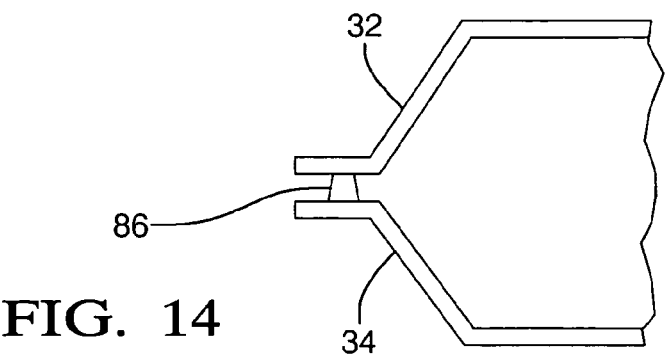
FIG. 14 is an enlarged partial view of FIG. 13 before upper and lower sections are joined.

Referring now to FIGS. 13 and 14, another embodiment illustrating a cross sectional view of a integrated structural load path assembly shows air ducts 108 formed by joining first and second sections 32 and 34 around metal tube 13. FIG. 13 depicts the assembly after vibration welding first and second sections 32 and 34 around tube 13. FIG. 14 shows a partial view of the assembly shown in FIG. 13 generally at circle 110 before vibration welding where the lower second section 34 plastic component has protrusion 86 extending from a surface facing first section 32 to be joined therewith. More specifically, for example, in the linear vibration method of thermoplastic assembly, transverse, reciprocating motion is used to melt the thermoplastic protrusions 86 to enable blending and subsequently bonding of the two plastic sections 32 and 34 together. Protrusions 86 are optimally employed on at least one of first and second sections 32 and 34 generally located where first and second sections 32 and 34 are joined together shown generally at 112 in FIG. 13.

Figure 15:
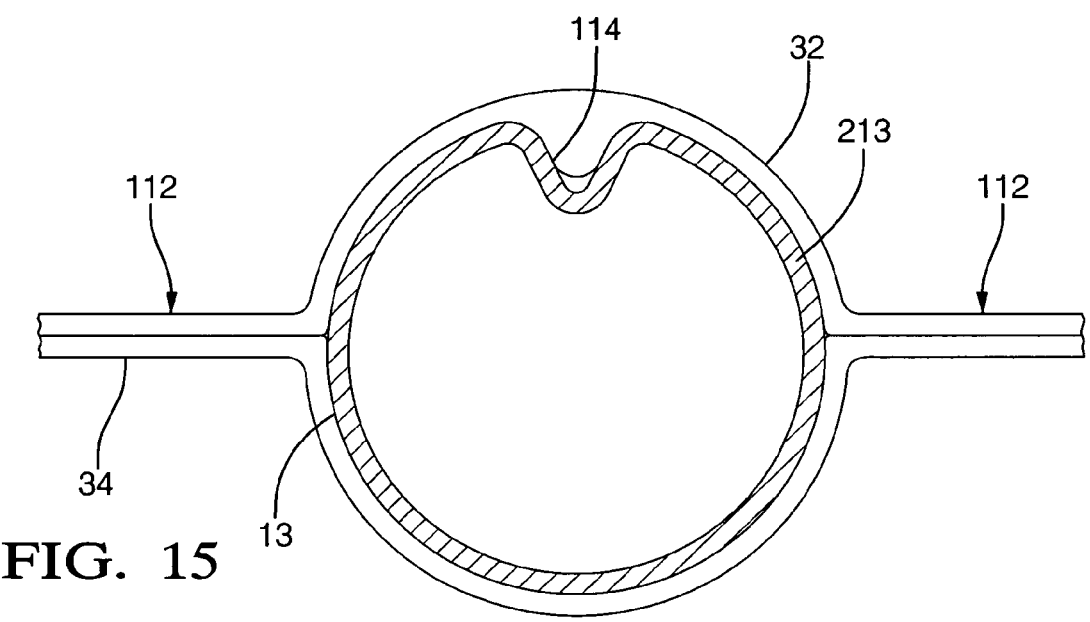
FIG. 15 is a side view of another exemplary attachment means between a metal tube having a channel and upper and lower sections.

FIG. 15 depicts a partial cross sectional view of FIG. 13 employing an alternative embodiment of metal structure 13. More specifically, metal structure 13 resembles metal tube 13 shown in FIG. 13, however the metal structure 13 in FIG. 15 includes a channel 114 configured in a surface defining metal tube 13 shown generally at 213. Channel 114 in tube 213 facilitates limitation of axial rotation of tube 213 between first and second sections 32 and 34 after using means for integration between the same. Means for integration includes, but is not limited to, vibration welding, sonic welding, heat staking, gluing, mechanical fastening, including combinations of at least one of the foregoing, and the like. Means for integration is further carried at locations on contacting sections of first and second sections 32 and 34 indicated at 112, as described with reference to FIG. 13.

Figure 16:
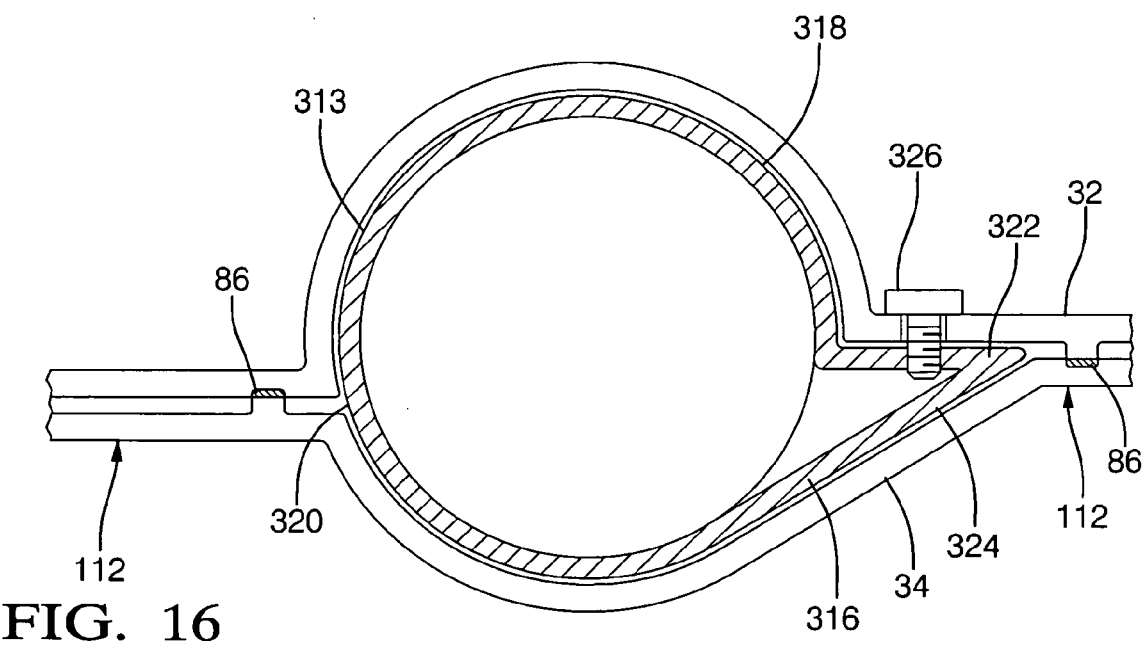
FIG. 16 is a side view of another exemplary attachment means between a metal tube having a lip and upper and lower sections.

FIG. 16 is yet another alternative embodiment of an integrated structural load path assembly between first and second sections 32, 34 using an alternative metal structure 13 indicated as a metal tube 313 having a member 316 extending from a round portion 318 defining a surface 320 of tube 313. In one embodiment illustrated in FIG. 16, member 316 includes a first portion 322 extending substantially normal to surface 320 from which first portion 322 extends and a second portion 324 depending from first portion at one end and another end angular extending toward surface 320. First portion 322 is configured with a threaded aperture to receive a mechanical faster 326 extending through first section 32 to fasten first section 32 with tube 313.

Member 316 extending from tube 313 further facilitates limitation of axial rotation of tube 313 between first and second sections 32 and 34 after using means for integration between the same. Means for integration includes, but is not limited to, vibration welding, sonic welding, heat staking, gluing, mechanical fastening, including combinations of at least one of the foregoing, and the like. Means for integration may be further carried out at locations on contacting sections of first and second sections 32 and 34 indicated at 112 proximate protrusions 86, as described with reference to FIGS. 13 and 15.

Figure 17:
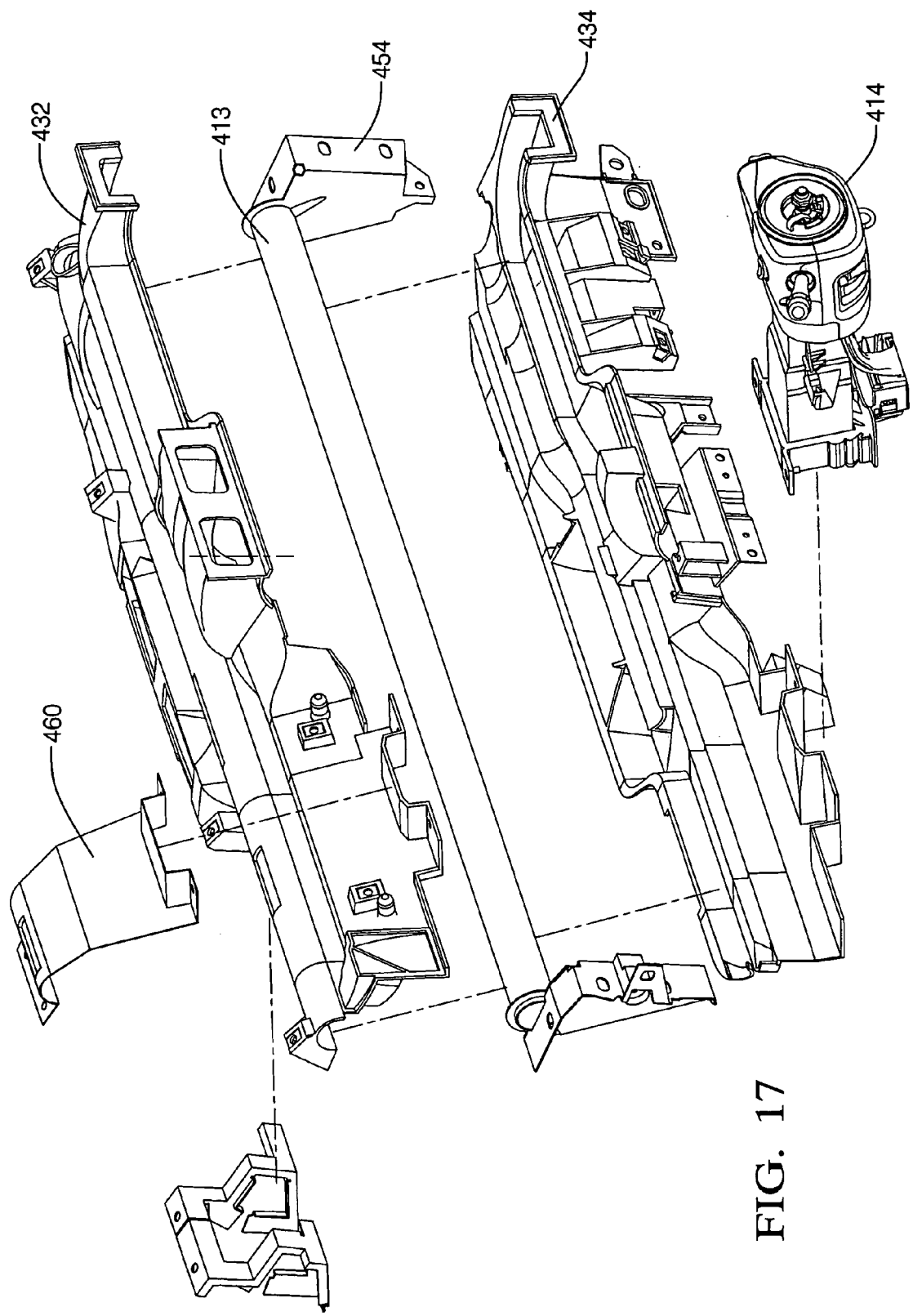
FIG. 17 is an exploded perspective view of an alternative structural attachment system of the present invention.
Figure 18:
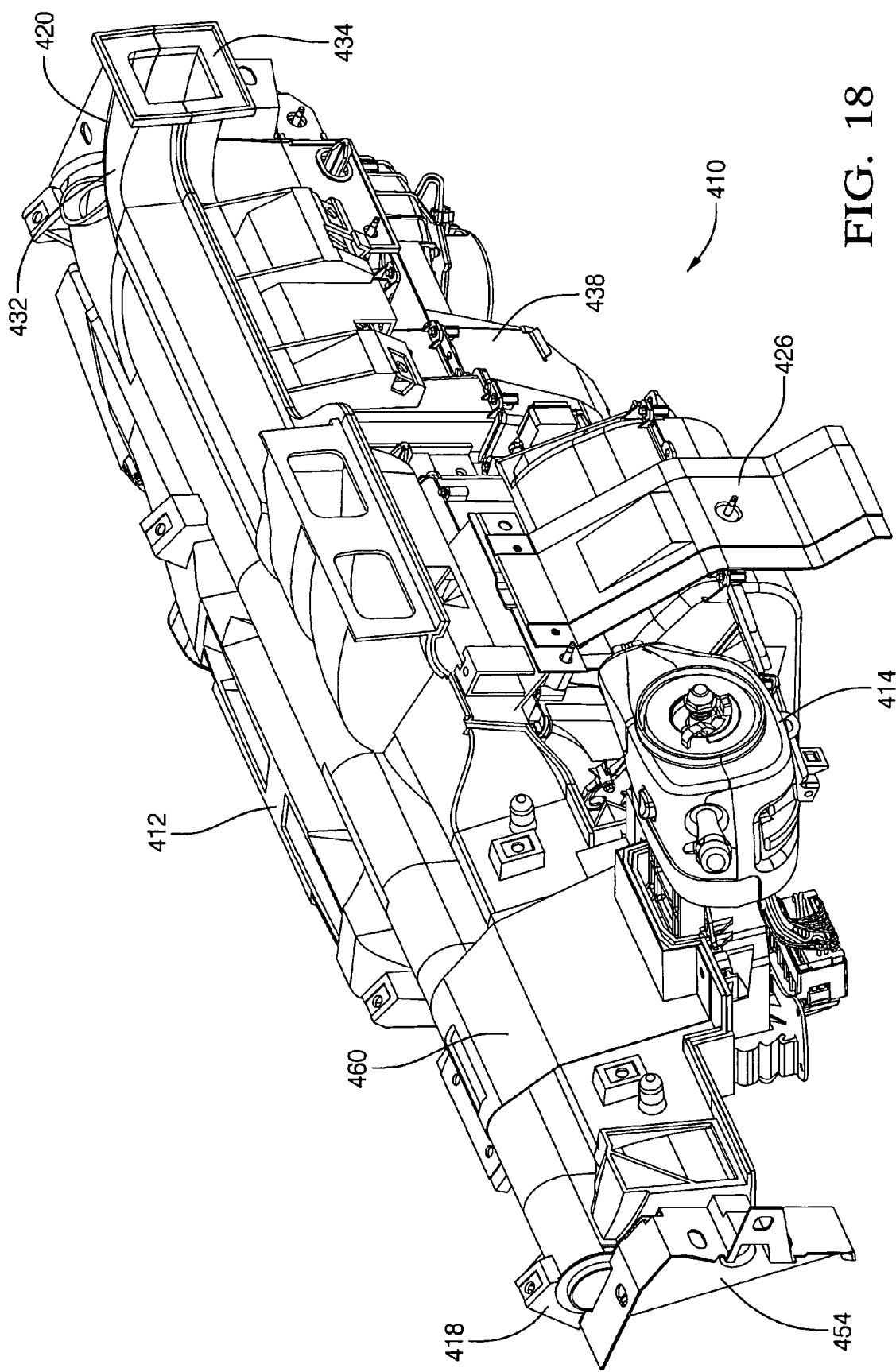
FIG. 18 is a perspective view of the structural attachment system of FIG. 17 in assembled form.

Referring now to FIGS. 17 and 18, an alternative embodiment of the present invention is illustrated. Herein, component parts performing similar or analogous functions are labeled in multiples of 400. Ends 418 and 420 of tube 413 depend from mounting brackets 454 configured to couple with vehicle body 30 when mounting brackets 454 are installed in the vehicle. Mounting brackets 454 are secured to tube 413 to limit rotation thereof and for mounting structural support system 410 within the vehicle to provide a load path assembly for components mounted to duct assembly 412 integrated with tube 413.

Duct assembly 412 includes first section 432 and second section 434. Steering column 414 is mounted below second section 434 and further supported with a support cowl 460 disposed over first section 432. Steering column is mechanically fastened to support cowl 460 having duct assembly provide a load bearing area for steering column 414 while also providing an air duct system for ventilating an interior of the vehicle.

Duct assembly also provides a load bearing path for HVAC module 438 disposed within the vehicle in fluid communication with structural air duct assembly 12 under second section 434. In addition, HVAC module 438 is further supported and mounted to center brace 426 which extends from structural air duct assembly 412 to vehicle floor 24. Structural air duct assembly 412 is also supported by a plenum 28 and vehicle body 30, shown as an engine wall, for example (see also FIG. 6).

Structural air duct assembly 412 is formed of at least two sections including first section 432 and second section 434. First and second sections 432 and 434 are complementary in nature so as to permit the two to mate with each other to form structural air duct assembly 412. Second section 434 comprises a lower base section. First section 432 comprises an upper section. First and second sections 432 and 434 are mated to one another to form structural air duct assembly 12 having tube 13 therebetween to integrate the energy management properties of tubular metal and the integration potential of molded plastic components using means for integration discussed above.

The present invention provides a simple yet effective system for providing attachment and load reinforcement at the point of attachment of various vehicle components. Particularly, the present invention provides a system of attaching and supporting a steering column, for example, to a structural air duct assembly by an integral structural attachment assembly.

The present invention preserves the structural integrity of the attachment in critical load bearing areas. At the same time, the assembly allows for the utilization of a lightweight structural air duct assembly 12. Therefore, the mass of the entire assembly is advantageously reduced and minimized relative to other conventional assemblies which use much more massive parts for attaching vehicle components to one another.

Particularly, the invention allows for both the structural air duct assembly to be constructed of plastic while encasing a metal structural support member. This, as mentioned, serves to provide load reinforcement in selected areas and, more specifically, in the load bearing area. Such reinforcement and support provides efficient and effective control, transfer, and distribution of loads associated with the steering column, for example, and also acts to regulate and control vertical oscillatory motion of other vehicle components mounted thereto, particularly the steering column.

The above disclosed plastic/metal integrated air duct assembly mounted as a hybrid cross car structural beam allows structural performance over plastic alone while integrating the benefits of a plastic structure. For example, smaller packaging space is required and multiple styled instrument panels may be employed on a common metal structure requiring only a change in plastic parts only. The metal provides structure while the separate plastic components are used for ductwork and attachment provisions for other components using metal brackets therebetween.

Furthermore, the integration of the metal structure with the plastic duct assembly reduces squeak and rattle potential caused by components mounted to the integrated assembly.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An integrated structural system for a vehicle, comprising:
a molded duct system configured to guide airflow, said molded duct system having a first section having a first flange portion and a second section having a second flange portion, said molded duct system configured to operably attach a vehicle component thereto; and
a metal structure, said metal structure integrated with said molded duct system by a means for integrating said metal structure with said molded duct system forming an integrated structural load path assembly, said integrated structural load path assembly being configured as a load bearing area to distribute a load of said vehicle component operably attached thereto over said integrated structural load path assembly, wherein said means for integrating said metal structure with said molded duct system includes joining said first flange portion and said second flange portion by one of;
sonic welding,
heat staking,
insert molding, and
gluing.

2. The integrated structural system of claim 1, wherein said integrated structural load path assembly is a cross car structural beam having a vehicle HVAC air duct assembly.

3. The integrated structural system of claim 1, wherein said vehicle component is one of:
a steering column; and
an HVAC assembly.

4. The system integrated structural of claim 1, wherein said metal structure is at least one of:
a metal tube; and
a metal frame member.

5. The integrated structural system of claim 1, wherein said metal structure is fabricated by one of stamping, bending, hydroforming, extruding and casting.

6. The integrated structural system of claim 1, wherein said metal structure includes one of steel, aluminum, and magnesium.

7. The integrated structural system of claim 2, wherein said metal structure extends a length of said cross car beam structure.

8. The integrated structural system of claim 7, wherein said metal structure includes brackets at opposing ends thereof for mounting said integrated structural load path assembly to the vehicle.

9. The integrated structural system of claim 1, wherein when said means for integrating said metal structure with said molded duct system includes insert molding, said insert molding includes at least one of:
compression molding; and
injection molding.

10. The integrated structural system of claim 9, wherein said compression molding includes extrusion deposition compression molding (EDCM).

11. The integrated structural system of claim 1, wherein said means for integration further includes a protrusion extending from at least one of said first section and said second section toward said metal structure encased therebetween.

12. The integrated structural system of claim 11, wherein said protrusion extends into one of a cavity and an aperture configured in said metal structure.

13. The integrated structural system of claim 12, wherein said protrusion extends to an opposing section of said molded duct system.

14. The integrated structural system of claim 1, wherein said metal structure includes a portion extending therefrom configured to receive a mechanical fastener extending through one of said first and second flange portions.

15. The integrated structural system of claim 1, wherein said molded duct assembly is configured to provide air to an internal compartment of the vehicle.

16. The integrated structural system of claim 1, wherein said first and second sections of said molded duct assembly is composed of a plastic.

17. The integrated structural system of claim 1, wherein said first and second sections form a one-piece structure, wherein said first and second sections define portions of said one-piece structure integrated with said metal structure.

* * * * *